(12) United States Patent
Ahmadi

(10) Patent No.: US 7,940,723 B2
(45) Date of Patent: May 10, 2011

(54) DYNAMIC/STATIC TRANSPORT CHANNEL TO PHYSICAL CHANNEL MAPPING IN BROADBAND WIRELESS ACCESS SYSTEMS

(75) Inventor: Sassan Ahmadi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 788 days.

(21) Appl. No.: 11/927,119

(22) Filed: Oct. 29, 2007

(65) Prior Publication Data

US 2009/0109905 A1 Apr. 30, 2009

(51) Int. Cl.
*H04W 4/00* (2009.01)

(52) U.S. Cl. ........ 370/329; 370/331; 370/338; 370/350; 370/401; 370/432; 370/471; 370/498; 375/260; 375/340; 455/464

(58) Field of Classification Search .................. 370/331, 370/338, 432, 471, 498, 329, 350, 401; 375/260, 375/340; 455/464
See application file for complete search history.

(56) References Cited

U.S. PATENT DOCUMENTS

| 6,614,810 | B1 * | 9/2003 | Lee et al. | 370/471 |
|---|---|---|---|---|
| 7,436,857 | B2 * | 10/2008 | Fong et al. | 370/498 |
| 7,706,340 | B2 * | 4/2010 | Bronez | 370/338 |
| 7,756,532 | B2 * | 7/2010 | Wallentin et al. | 455/464 |
| 2004/0101071 | A1 * | 5/2004 | Naito | 375/340 |
| 2004/0125787 | A1 * | 7/2004 | May et al. | 370/350 |
| 2006/0146858 | A1 * | 7/2006 | Kim | 370/432 |
| 2007/0121743 | A1 * | 5/2007 | Zuckerman et al. | 375/260 |
| 2008/0232401 | A1 | 9/2008 | Ahmadi | |
| 2008/0317047 | A1 * | 12/2008 | Zeng et al. | 370/401 |
| 2010/0157940 | A1 * | 6/2010 | Shitara | 370/331 |

OTHER PUBLICATIONS

3RD Generation Partnership Project (3GPP), 3GPP TS 36.300 V8.1.0 (Jun. 2007) Technical Specification, 3GPP Organizational Partners, Valbonne, France.

* cited by examiner

*Primary Examiner* — William Trost, IV
*Assistant Examiner* — Toan D Nguyen
(74) *Attorney, Agent, or Firm* — Schwabe, Williamson & Wyatt, P.C.

(57) ABSTRACT

Embodiments of the present invention provide for transport and logical channels to be used in wireless transmissions to and from mobile stations. In some embodiments, a mapper may be used to dynamically or statically map the transport channels to the physical channels. In some embodiments, physical layers may receive bearer traffic in physical channels and transmit the bearer traffic over corresponding radio frequency carriers. Other embodiments may be described and claimed.

19 Claims, 8 Drawing Sheets

DYNAMIC/STATIC TRANSPORT CHANNEL TO PHYSICAL CHANNEL MAPPING IN BROADBAND WIRELESS ACCESS SYSTEMS

FIELD

Embodiments of the present invention relate to the field of broadband wireless access networks, and more particularly, to dynamic/static mapping of transport channels to physical channels in devices used in said broadband wireless access networks.

BACKGROUND

Mobile Worldwide Interoperability for Microwave Access (WiMax) is a broadband wireless access technology based on Institute of Electrical and Electronics Engineers (IEEE) 802.16-2004 as amended by IEEE 802.16e-2005 (released Feb. 28, 2006) (hereinafter "IEEE 802.16e"). Mobile WiMax utilizes a scalable orthogonal frequency division multiple access (OFDMA) scheme to deliver wireless broadband packet data services to mobile terminals.

Universal Mobile Telecommunications System (UMTS) is a $3^{rd}$ generation cellular technology based on cellular system standards developed by the $3^{rd}$ Generation Partnership Project (3GPP). 3GPP long-term evolution (LTE) is a project that aims to improve UMTS through modifications and/or extensions that will result in release 8 of the UMTS standards. These improvements seek to provide broadband wireless services to mobile terminals.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the present invention, the phrase "A and/or B" means "(A), (B), or (A and B)." For the purposes of the present invention, the phrase "A, B, and/or C" means "(A), (B), (C), (A and B), (A and C), (B and C), or (A, B and C)."

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present invention define a set of transport channels, a set of physical channels, and various mappings of the transport channels to physical channels in an OFDMA broadband wireless access system. The mappings may provide that the transport channels are statically (e.g., permanently) assigned to respective physical channels or dynamically (e.g., temporarily or in a time-varying manner) assigned. Further embodiments described herein provide the use of these transport channels, physical channels, and mappings in multicarrier transmission schemes, e.g., IEEE 802.16e-2005 and its evolution (e.g., IEEE 802.16m), or other similar broadband radio access technologies.

Figure 1:
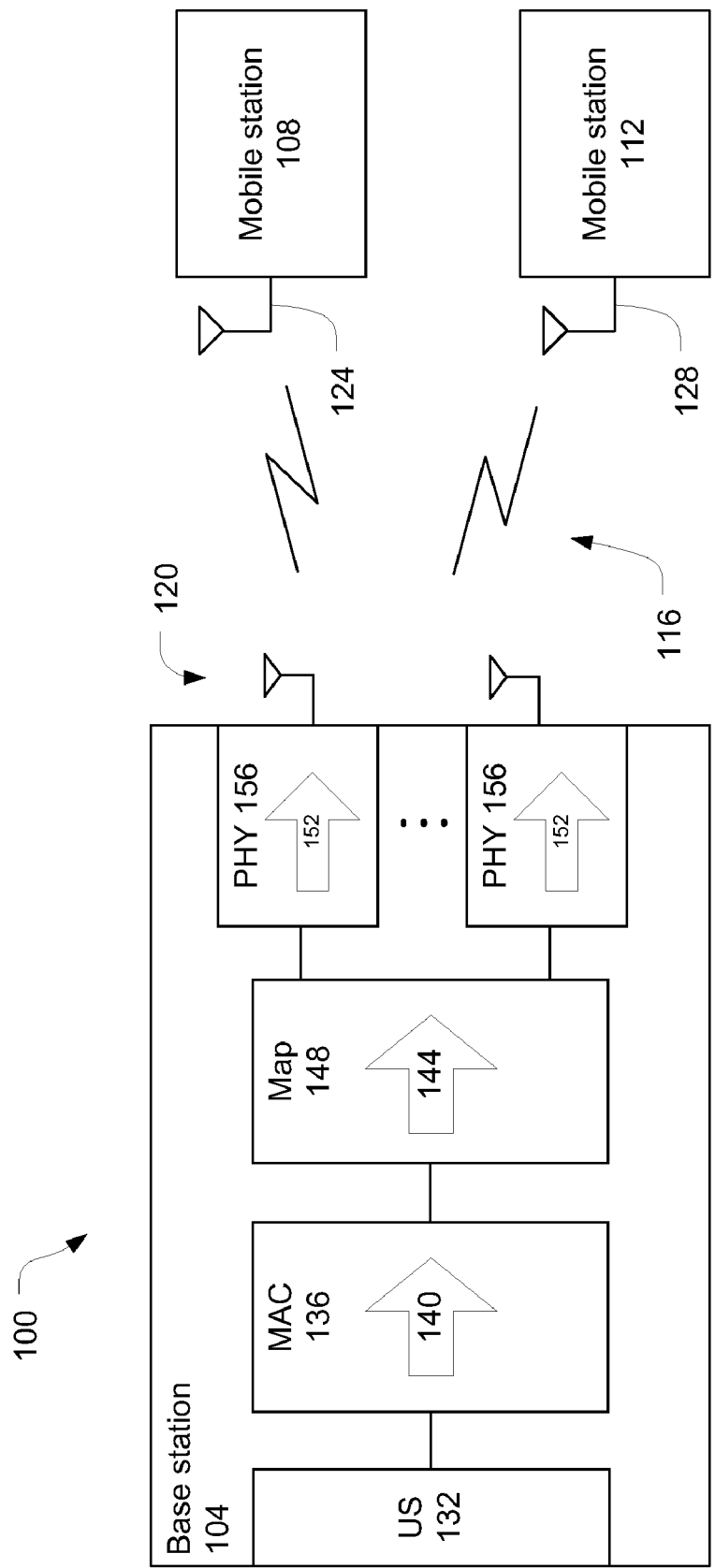
FIG. 1 illustrates a wireless communication system in accordance with various embodiments of the present invention.

FIG. 1 illustrates a wireless communication system 100 in accordance with an embodiment of this invention. In this embodiment, the communication system 100 is shown with three wireless communication devices, e.g., base station 104, mobile station 108, and mobile station 112, communicatively coupled to one another via an over-the-air (OTA) interface 116.

In various embodiments, the mobile stations 108 and 112 may be a mobile computer, a personal digital assistant, a mobile phone, etc. The base station 104 may be a fixed device or a mobile device that may provide the mobile stations 108 and 112 with network access. The base station 104 may be an access point, a base transceiver station, a radio base station, a node B, etc.

The wireless communication devices 104, 108, and 112 may have respective antenna structures 120, 124, and 128 to facilitate the communicative coupling. Each of the antenna structures 120, 124, and 128 may have one or more antennas (two shown in antenna structure 120). An antenna may be directional or omnidirectional antenna, including, e.g., a dipole antenna, a monopole antenna, a patch antenna, a loop antenna, a microstrip antenna or any other type of antenna suitable for transmission/reception of radio frequency (RF) signals.

In various embodiments, the communication system 100 may be compatible with any wireless communication standards including, e.g., cellular system standards, wireless computer network standards, etc. In one embodiment, the wireless communication devices may operate in accordance with the IEEE 802.16 standard (e.g., IEEE 802.16e-2005 and its evolution (e.g., IEEE 802.16m)).

The base station 104 may have upper sublayers 132 that provide bearer traffic to a MAC sublayer 136. The bearer traffic may be any type of information that may pass through the base station 104 and be transmitted over the OTA interface 116. The bearer traffic may be arranged in data and control bearers. Bearer traffic may include multicast and/or broadcast (MC/BC) services and unicast services.

The MAC sublayer 136, or MAC 136, may map the bearer traffic, through a set of logical channels 140, to a set of transport channels 144 in a mapper 148. The mapper 148 may map the bearer traffic, through the set of transport channels 144, to a set of physical channels 152 in a plurality of physical layers (PHYs) 156. The mapper 148 may map the bearer traffic among the physical channels 152 according to any of a number of mapping schemes.

The PHYs 156 may transmit the bearer traffic in the physical channels 152 over corresponding RF carriers of the OTA interface 116. An RF carrier may be a discrete band of frequencies used to transmit wireless bearer traffic. The RF carriers may be any of a variety of sizes (e.g., bandwidths) and may be located in any of a variety of frequency spectrums.

The base station 104 may support multicarrier deployment by being capable of communicating with the mobile stations on more than one RF carrier. The transport channels 144 and physical channels 152 may be defined in a manner to take advantage of such a multicarrier deployment to enable efficient support of large bandwidths. For example, one instantiation of the MAC 136 may effectively utilize a 100 Megahertz (MHz) bandwidth through the use of transport channels. Since an RF carrier with 100 MHz contiguous bandwidth may not be practically available, the mapper 148 may distribute the bearer traffic, using groupings of physical channels 152 and associated PHYs 156, among an aggregation of a number of contiguous and/or noncontiguous RF carriers, e.g., an aggregation of five 20 MHz RF carriers, to achieve an effective bandwidth of 100 MHz.

The transport channels 144 may group bearer traffic according to how and with what characteristics the bearer traffic is to be transferred over the OTA interface 116 from the perspective of the MAC 136. This may be differentiated from the logical channels 140, which may group bearer traffic according to what type of information is in the bearer traffic, and the physical channels 152, which may group the bearer traffic according to how and with what characteristics the bearer traffic is transferred over the OTA interface 116 from the perspective of the mapper 148 or PHYs 156.

Figure 2:
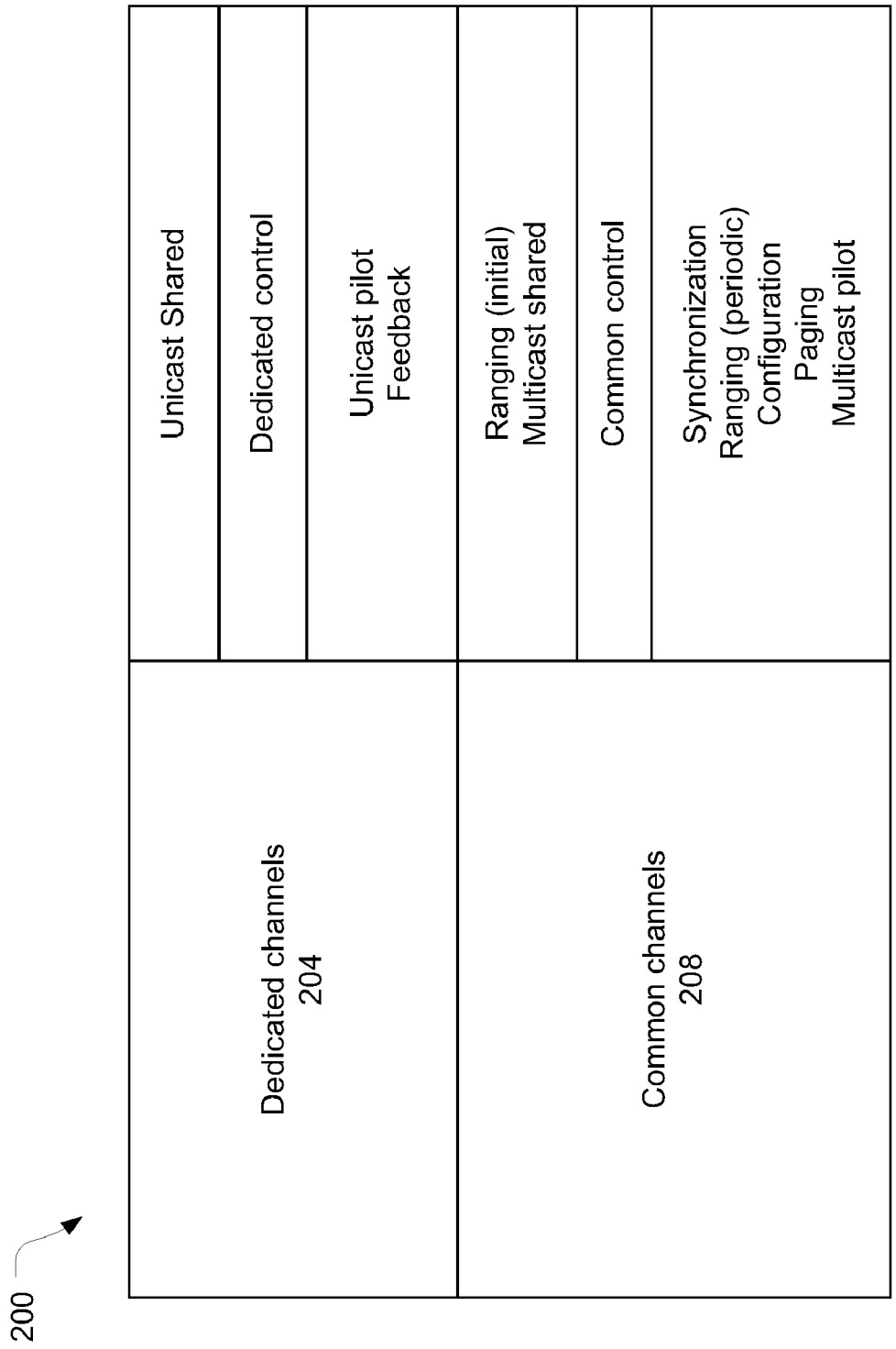
FIG. 2 illustrates transport channels in accordance with various embodiments of the present invention.

FIG. 2 shows transport channels 200 in accordance with an embodiment of the present invention. There may be two types of transport channels 200: dedicated channels 204 and common channels 208. Distinct physical layer processing may be applied to each of these types of transport channels 200.

The dedicated channels 204 may include unicast shared channels; dedicated control channels; unicast pilot channels, and feedback channels. A dedicated channel may be a point-to-point bidirectional channel for conveying information between a particular mobile station and a base station.

The common channels 208 may include ranging (also known as random access) channels for initial ranging; multicast shared channels; control channels; synchronization channels; ranging channels for periodic ranging; configuration channels; paging channels; and multicast pilot channels. A common channel may be a point-to-multipoint unidirectional channel conveying information (e.g., signaling messages, control messages, etc.) to all users in the coverage area of a base station. A mobile station may not have to register with the base station in order to receive traffic on the common channels.

A shared channel, which may be a dedicated channel or a common channel, may be shared (or multiplexed) through time division multiplex (TDM), frequency division multiplex (FDM), code division multiplex (CDM), space division multiplex (SDM) schemes or combination of the above schemes among a multitude of users.

The unicast transport channels, e.g., unicast pilot, unicast shared, dedicated control, and feedback, may be point-to-point channels in the uplink or downlink.

The multicast transport channels, e.g., multicast pilot, multicast shared, paging, synchronization, and configuration, may be point-to-multipoint channels in the downlink direction.

The transport channels 200 shown in FIG. 2 may be defined for a wireless communication device operating in accordance with the IEEE 802.16m standard. However, similar concepts may be adapted to other radio access technologies, e.g., 3GPP LTE, in other embodiments. Furthermore, other types and/or numbers of transport channels may be used in other embodiments.

A physical channel may be defined as a manifestation of physical resources (e.g., time, frequency, code, and space) and corresponding PHY processing that may be used to transport bearer traffic to and/or from one or more mobile stations via an OTA interface. Physical channels may represent the actual PHY processing and its characteristics such as channel coding/decoding, signal mapping/demapping, baseband modulation/demodulation, multiple-input multiple-output (MIMO) processing, etc. on data and control signal bearers.

Physical channels may be defined in consideration of specific PHY processing that may be performed on various types of bearer traffic. PHY processing that may be performed differently from one type of bearer traffic to another. This may include, but is not limited to, MIMO schemes, modulation and coding schemes (MCS), hybrid-automatic repeat request (H-ARQ), etc.

In one embodiment, the defined physical channels may include a downlink physical broadcast channel (DL-PBCH); a downlink physical control channel (DL-PCCH); a downlink physical data channel (DL-PDCH); an uplink physical control channel (UL-PCCH); and an uplink physical data channel (UL-PDCH).

The DL-PBCH may include, but is not limited to, bearer traffic such as common control, multicast-broadcast, broadcast of system configuration information, synchronization and system timing information. The DL-PCCH and UL-PCCH may include, but is not limited to, bearer traffic such as dedicated control. The DL-PDCH and UL-PDCH may include, but is not limited to, bearer traffic such as user traffic. The uplink may use a common control channel for random access (initial ranging), sounding, acknowledgement and negative acknowledgement (ACK/NACK), etc.

The DL-PBCH and the DL-PCCH may be separated due to differences between physical layer processing of common and dedicated physical control channels. For example, transmit-beamforming (TxBF) may be used for dedicated control whereas it may not be used for common control, a more robust MCS may be used for common control to increase reliability, etc.

As briefly stated above, the mapper 148 may map bearer traffic to the physical channels 152 according to any of a variety of mapping schemes. The mapping schemes may be defined depending on how multicarrier support in the base station or mobile station is defined.

Figure 3:
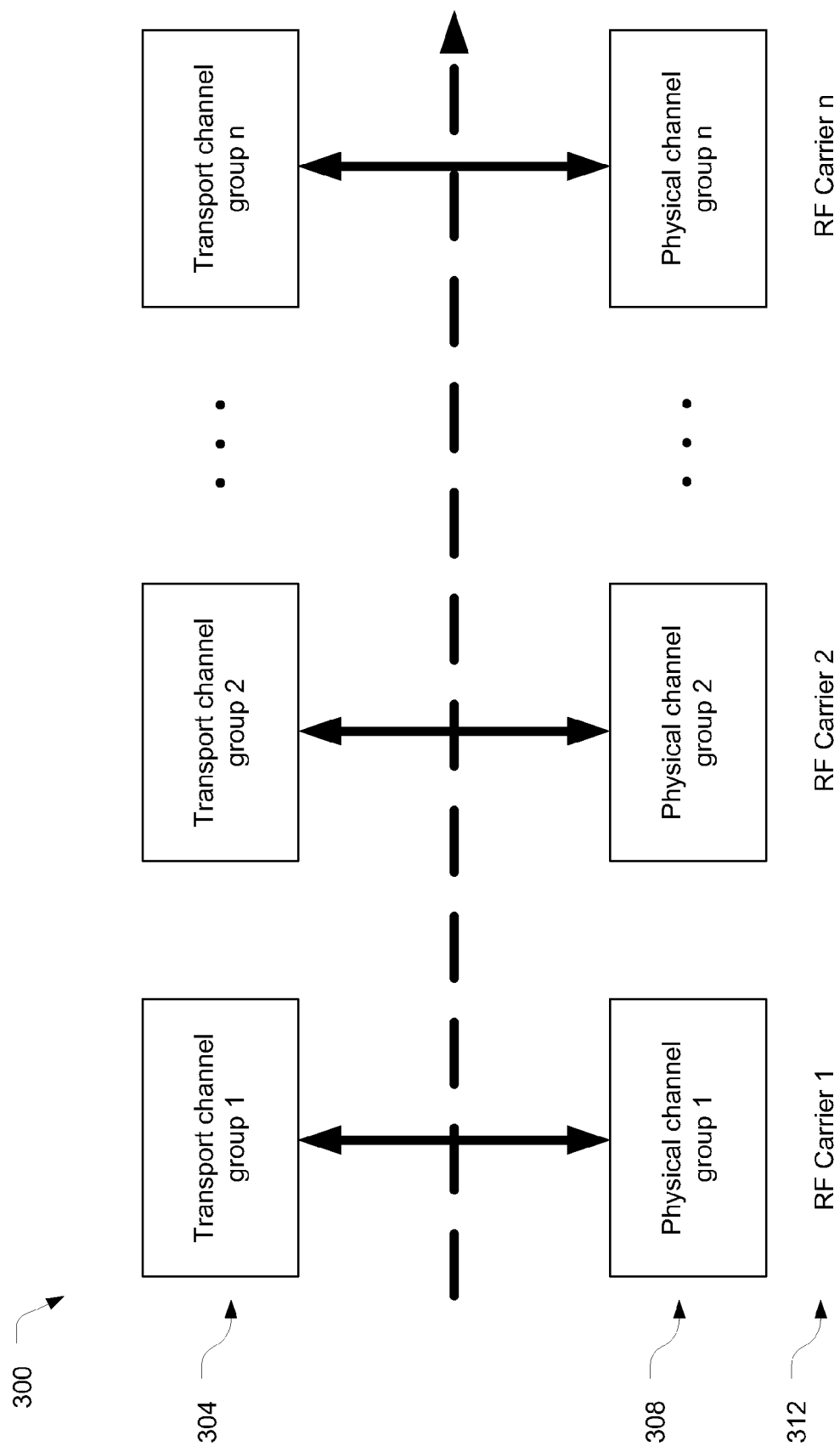
FIG. 3 illustrates a multicarrier mapping scheme, where each radio frequency (RF) carrier has multicast (or broadcast) services and unicast services, in accordance with various embodiments of the present invention.

FIG. 3 illustrates a multicarrier mapping scheme 300 in accordance with various embodiments of the present invention. Mapping scheme 300 provides that transport channel groups 1-n 304 are respectively mapped to physical channel groups 1-n 308 on a one-to-one basis. The physical channel groups 1-n 308, each of which correspond to one PHY, may be transmitted over respective RF carriers 1-n 312.

Each of the transport channel group and physical channel group associations may include all of the bearer traffic being directed to a corresponding group of mobile stations served by that particular RF carrier. As such, each of the RF carriers 1-n 312 may include both MC/BC services and unicast services.

Mapping scheme 300 may be utilized in a scenario where mobile stations with different bandwidths may be associated with certain RF carriers with similar bandwidths. For example, a 20 MHz mobile station may be served by a 20 MHz RF carrier, a 10 MHz mobile station may be served by a 10 MHz RF carrier, etc.

In some embodiments, as mentioned above, more than one RF carrier (contiguous and/or noncontiguous) may be aggregated to deliver bearer traffic to one or more mobile stations.

Figure 4:
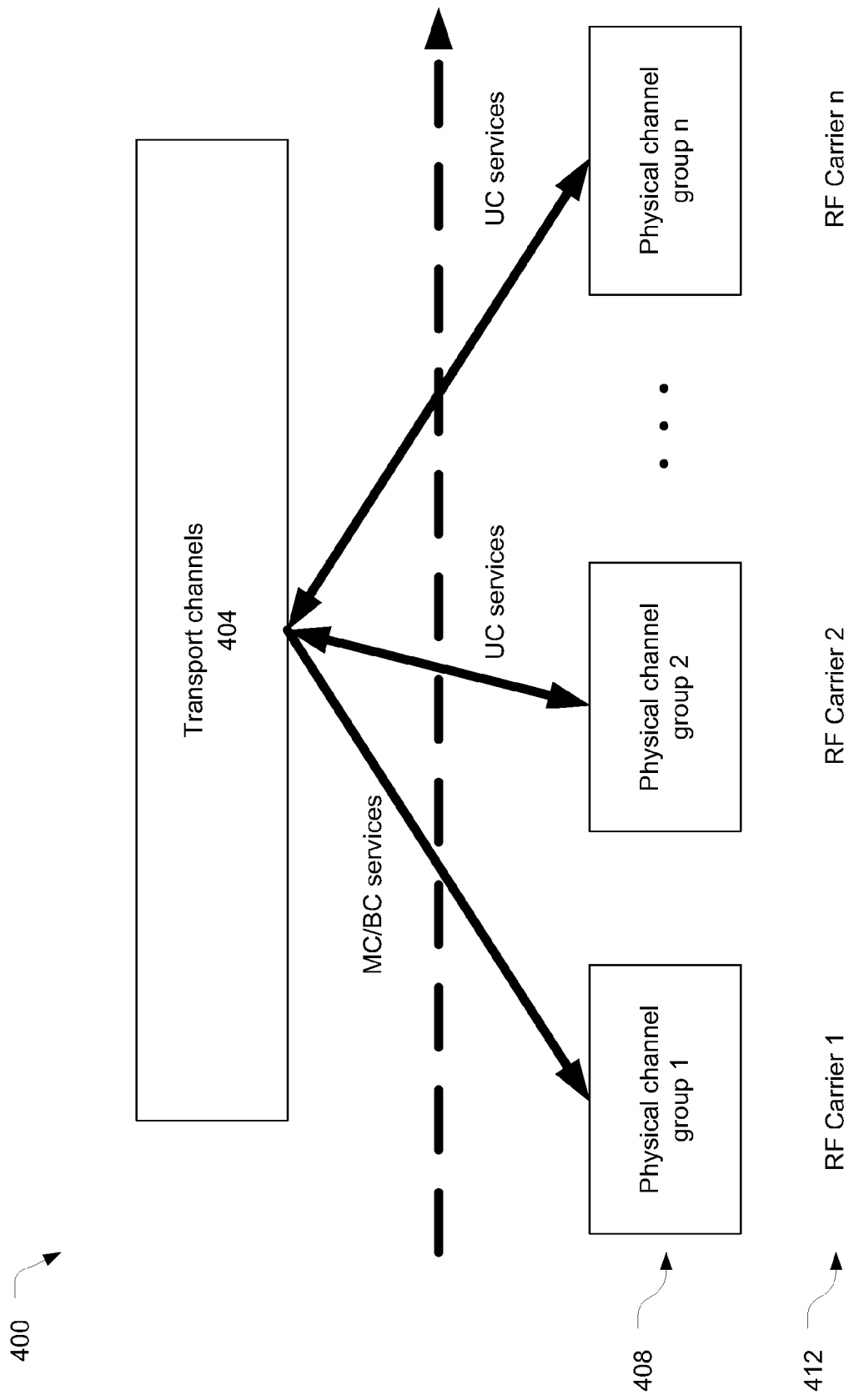
FIG. 4 illustrates another multicarrier mapping scheme, where some RF carriers may be dedicated to multicast (or broadcast) services and others may be dedicated to unicast services exclusively, in accordance with various embodiments of the present invention.

FIG. 4 illustrates a multicarrier mapping scheme 400 in accordance with various embodiments of the present invention. Mapping scheme 400 provides that transport channels 404 are mapped to physical channel groups 1-n 408. The physical channel groups 1-n 408 may be transmitted over respective RF carriers 1-n 412.

In the mapping scheme 400, some RF carriers may be dedicated to MC/BC services (e.g., RF carrier 1), while others may be dedicated to unicast services only (e.g., RF carriers 2-n). Thus, some physical channels may not exist on certain RF carriers.

In some embodiments, RF carrier 1 may be in the 700 MHz spectrum while at least one of the other RF carriers is in the 2.5 GHz spectrum. These embodiments may take advantage of the 700 MHz spectrum being more suitable to MC/BC service transmissions than the 2.5 GHz spectrum.

Mapping scheme 400 may be utilized in a load balancing scenario across the network where additional RF carriers may be used to schedule downlink or uplink traffic for mobile users capable of transmitting and receiving over a wider bandwidths or multiple RF carriers.

It may be noted that in the embodiment illustrated in FIG. 4, the control and/or signaling information may be included on each RF carrier dedicated to MC/BC or unicast services. This may allow a mobile station served by a particular RF carrier to receive all desired control or signaling information (that is not otherwise conveyed through MC/BC services received on RF carrier 1) on that particular RF carrier such as ACK/NACK and channel quality feedback control channels that exist for unicast services but not for MC/BC services.

Figure 5:
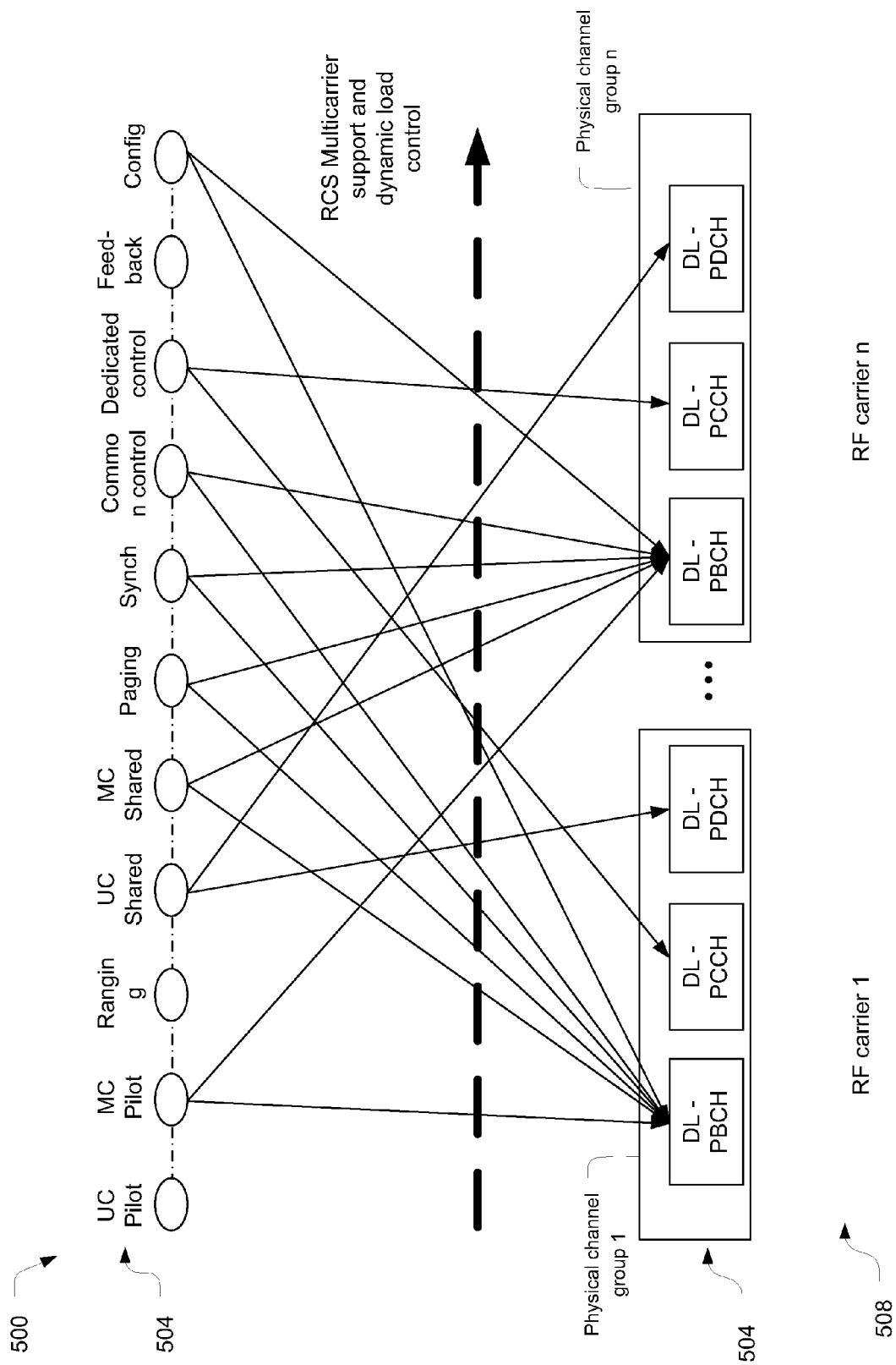
FIG. 5 illustrates a downlink mapping in accordance with various embodiments of the present invention.

FIG. 5 illustrates a DL mapping 500 in accordance with various embodiments of the present invention. The DL Mapping 500 may include transport channels 504 mapped to physical channel groups 1-n 504 for the downlink. In particular, the DL mapping 500 provides that MC pilot channels, MC shared channels, paging channels, synchronization channels, common control channels, and configuration channels are mapped to DL-PBCH; UC shared channels are mapped to DL-PDCH; and dedicated control channels are mapped to DL-PCCH.

Each of the physical channel groups 1-n 504 may be transmitted over a respective RF carrier of the RF carriers 1-n 508.

Figure 6:
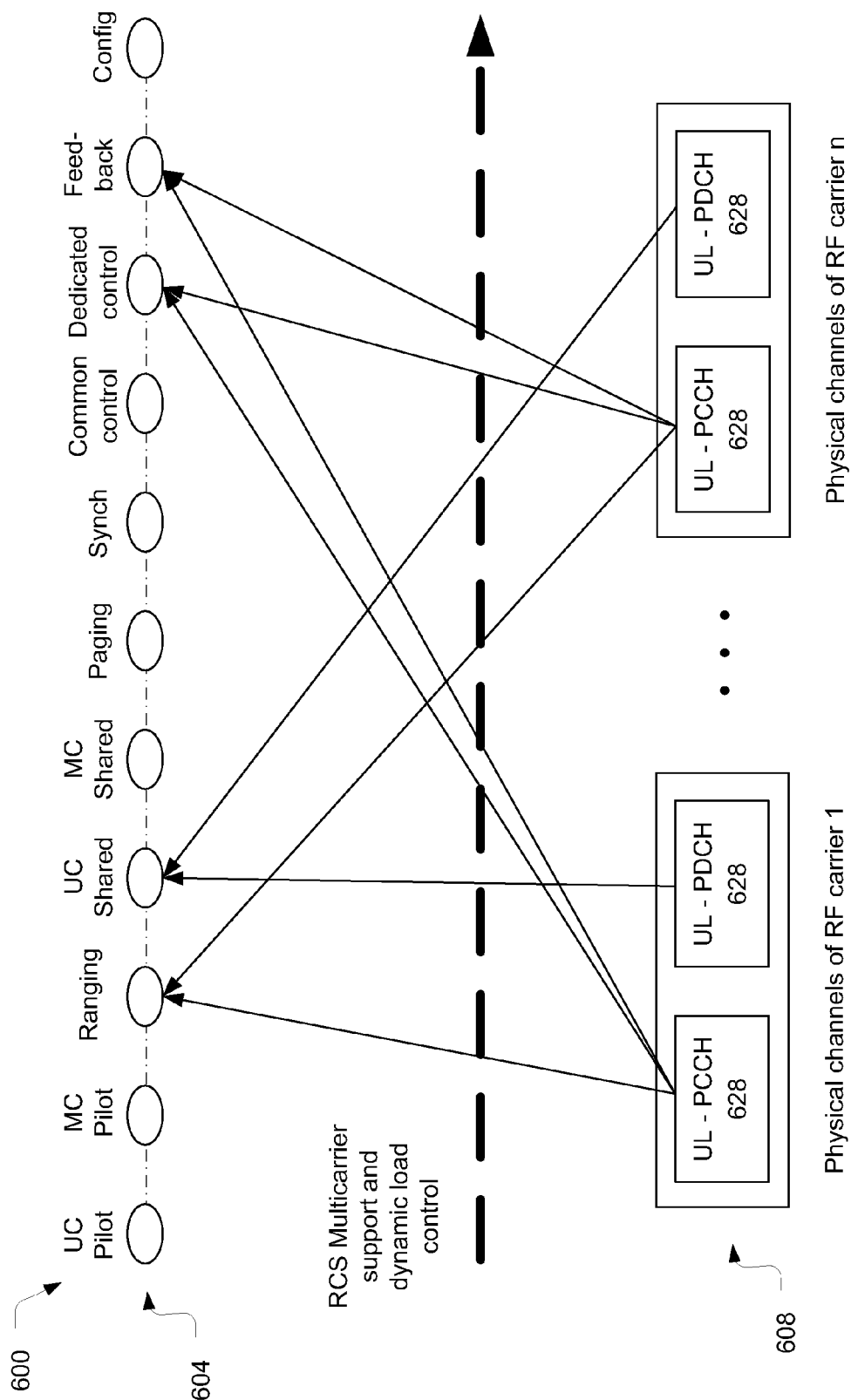
FIG. 6 illustrates an uplink mapping of transport channels to physical channels in accordance with various embodiments of the present invention.

FIG. 6 illustrates a UL mapping 600 in accordance with various embodiments of the present invention. The UL mapping 600 may include physical channel groups 1-n 608 mapped to transport channels 604 for the uplink. In particular, the UL mapping 600 provides that UL-PCCH is mapped to the ranging channels, dedicated control channels, and feedback channels; and the UL-PDCH is mapped to the unicast shared channels.

The DL mapping 500 and UL mapping 600 may be used in either of the multicarrier mapping schemes discussed above (e.g., multicarrier mapping scheme 300 or multicarrier mapping scheme 400) or in other mapping schemes.

Figure 7:
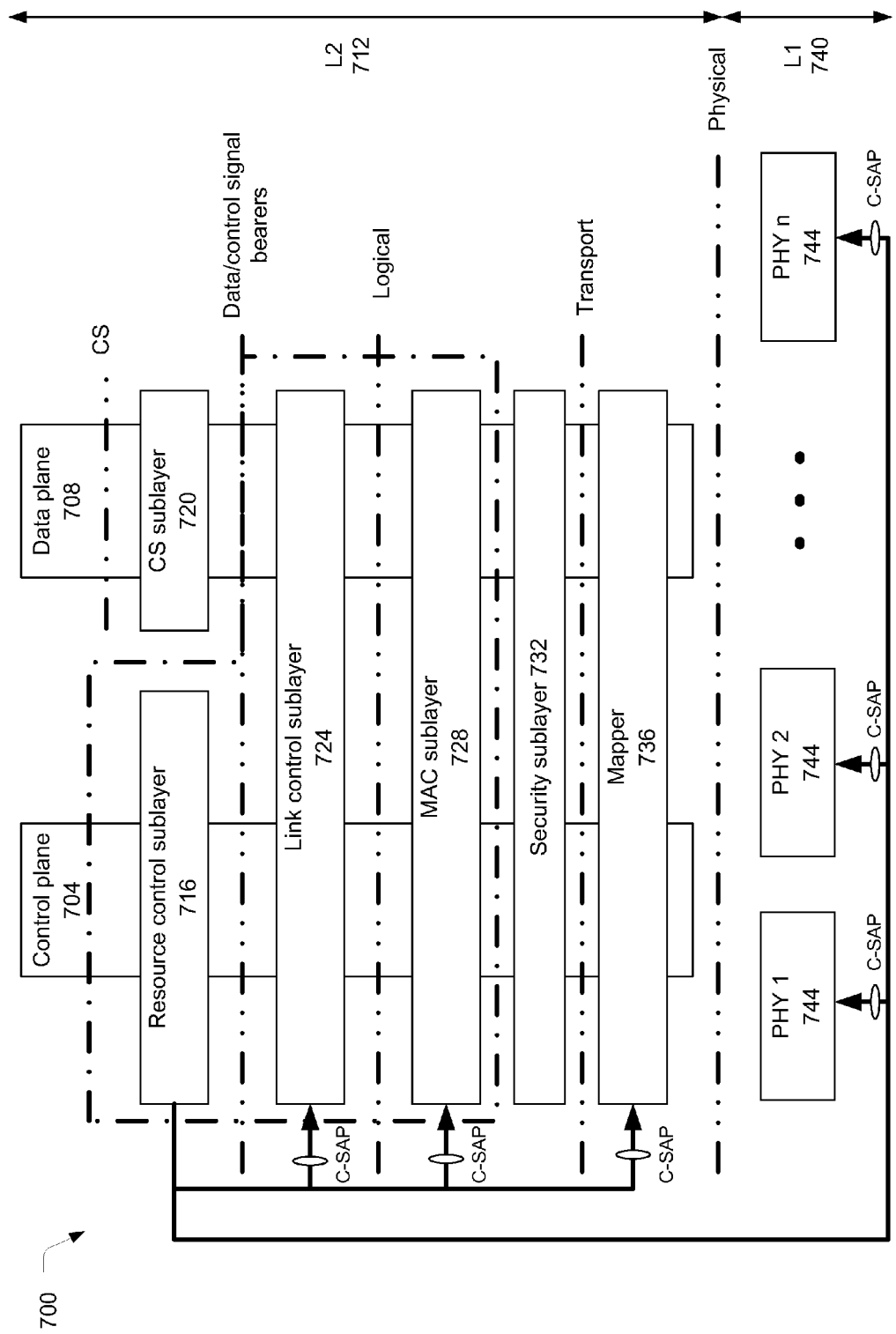
FIG. 7 illustrates a protocol structure that may be used in a wireless communication system for support of multiple RF carriers in accordance with various embodiments of the present invention.

FIG. 7 illustrates a protocol structure 700 that may be used in a wireless communication system in accordance with various embodiments of the present invention. The control and data information of the bearer traffic may flow through the protocol structure over parallel planes, e.g., control plane 704 and data plane 708, depending on the type of bearer.

Layer 2 712 of the structure 700 may include a resource control sublayer (RCS) 716 (in the control plane 704 only); a convergence sublayer (CS) 720 (in the data plane 708 only); a link control sublayer 724; a MAC sublayer 728; a security sublayer 732; and a mapper 736. It may be noted that in some systems, these layer 2 sublayers may be implicit or explicit. For example, the sublayers may be merely a soft grouping or classification of the layer 2 functions into different groups according to their characteristics.

Layer 1 740 of the structure 700 may include PHYs 1-n 744. At least two of the PHYs of the PHYs 1-n 744 may include discrete components (e.g., electronics, antennas, etc.) designed for modulating and transmitting signals over respective RF carriers.

The RCS 716 (which may also be referred to as a radio resource control (RRC)), may control the various functions with layers and/or sublayers through control signals, provided directly or through a service access point (C-SAP), as shown. Of particular relevance for the present description, the RCS 716 may use control signals to control how the mapper 736 maps the transport channels to the physical channels of the PHYs 1-n 744.

In one embodiment, the RCS 716 may dynamically control the mapper by distributing various services or traffic flows across different RF carriers. The RCS 716 may provide these dynamic controls based at least in part on mapping criteria. The mapping criteria could include, but is not limited to, a configuration of the base station, load control and balancing across RF carriers, and/or a deployment scenario.

Figure 8:
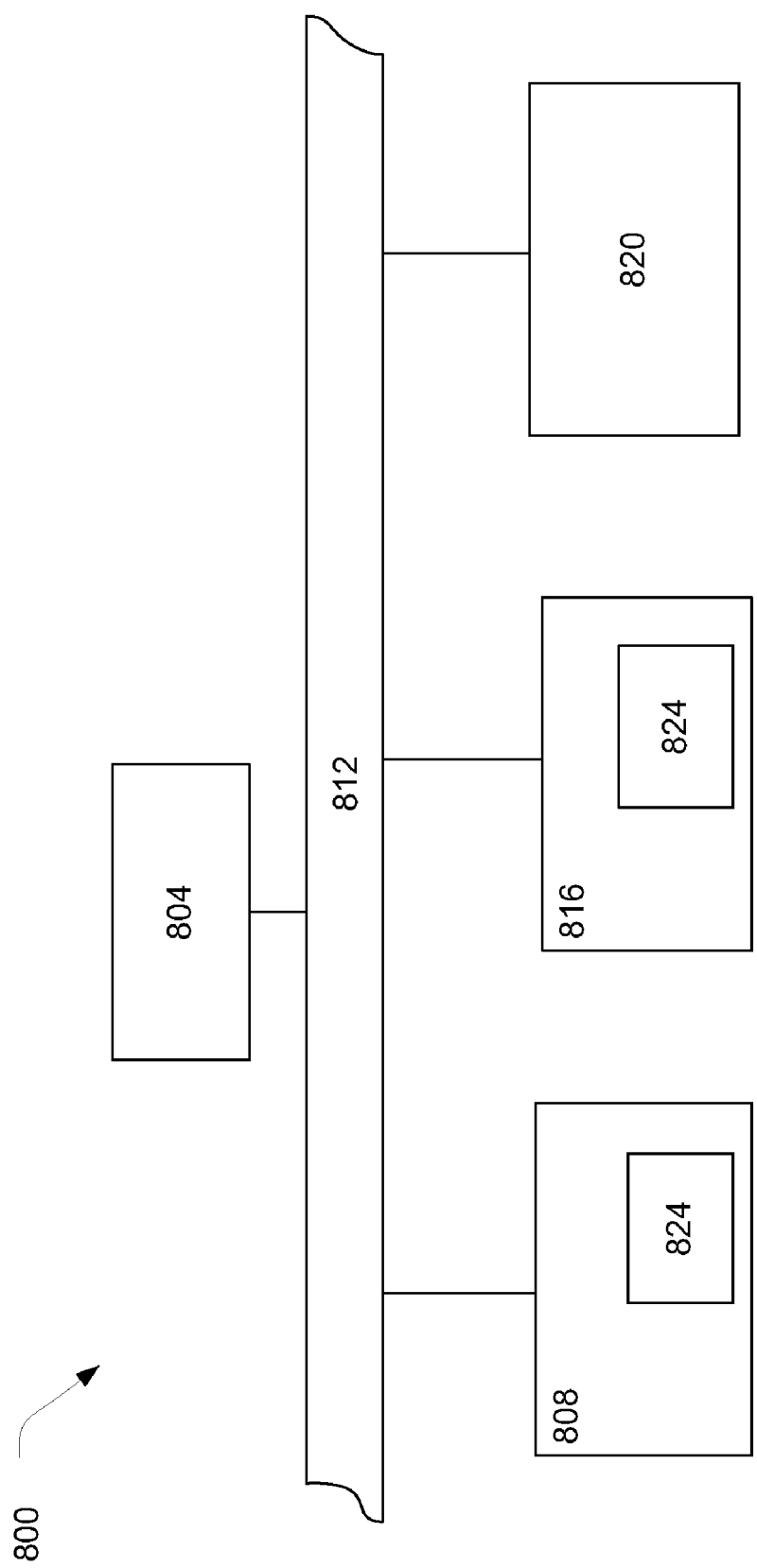
FIG. 8 illustrates a computing device in accordance with various embodiments of this invention.

FIG. 8 illustrates a computing device 800 capable of implementing a wireless network device in accordance with various embodiments. As illustrated, for the embodiments, computing device 800 includes processor 804, memory 808, and bus 812, coupled to each other as shown. Additionally, computing device 800 includes storage 816, and communication interfaces 820, e.g., a wireless network interface card (WNIC), coupled to each other, and the earlier described elements as shown.

Memory 808 and storage 816 may include in particular, temporal and persistent copies of mapping logic 824, respectively. The mapping logic 824 may include instructions that when accessed by the processor 804 result in the computing device 800 performing mapping operations described in conjunction with various wireless network devices in accordance with embodiments of this invention. These mapping operations include, but are not limited to, dynamically and/or statically mapping transport channels to physical channels.

In various embodiments, the memory 808 may include RAM, dynamic RAM (DRAM), static RAM (SRAM), synchronous DRAM (SDRAM), dual-data rate RAM (DDRRAM), etc.

In various embodiments, the processor 804 may include one or more single-core processors, multiple-core processors, controllers, application-specific integrated circuits (ASICs), etc.

In various embodiments, storage 816 may include integrated and/or peripheral storage devices, such as, but not limited to, disks and associated drives (e.g., magnetic, optical), universal serial bus (USB) storage devices and associated ports, flash memory, read-only memory (ROM), non-volatile semiconductor devices, etc.

In various embodiments, storage 816 may be a storage resource physically part of the computing device 800 or it may be accessible by, but not necessarily a part of, the computing device 800. For example, the storage 816 may be accessed by the computing device 800 over a network.

In various embodiments, computing device 800 may have more or less components, and/or different architectures.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. This application is intended to cover any adaptations or variations of the embodiments discussed herein. Therefore, it is manifestly intended that embodiments in accordance with the present invention be limited only by the claims and the equivalents thereof.

What is claimed is:

1. An apparatus comprising:
a media access control (MAC) sublayer configured to map bearer traffic to a plurality of transport channels;
a mapper coupled to the MAC sublayer and configured to map the bearer traffic, through the plurality of transport channels, to a plurality of physical channels; and
a plurality of physical layers coupled to the mapper and configured to transmit the bearer traffic in the plurality of physical channels over a plurality of radio frequency (RF) carriers, the plurality of physical layers respectively corresponding the plurality of RF carriers,
wherein each of the plurality of RF carriers has at least three physical channels of the plurality of physical channels including a downlink physical broadcast channel (DL-PBCH), a downlink physical control channel (DL-PCCH), and a downlink physical data channel (DL-PDCH);
wherein the mapper is further configured to dynamically map multicast pilot channels, multicast shared channels, paging channels, synchronization channels, common control channels, or configuration channels to the DL-PBCH; unicast shared channels to the DL-PDCH; and dedicated control channels to the DL-PCCH.

2. The apparatus of claim 1, wherein the mapper is configured to dynamically map the bearer traffic to the plurality of physical channels according to a mapping criteria.

3. The apparatus of claim 2, further comprising:
a resource control sublayer coupled to the mapper and configured to control the mapper to dynamically map the bearer traffic according to the mapping criteria.

4. The apparatus of claim 1, wherein the bearer traffic includes multicast and/or broadcast (MC/BC) services and unicast services and the mapper is further configured to map the bearer traffic according to a first mapping scheme in which a first physical layer of the plurality of physical layers receives both MC/BC services and unicast services or according to a second mapping scheme in which the first physical layer receives only MC/BC services and a second physical layer of the plurality of physical layers receives only unicast services.

5. The apparatus of claim 4, wherein the mapper is configured to dynamically select between the first mapping scheme or the second mapping scheme according to a mapping criteria.

6. The apparatus of claim 1, wherein bearer traffic directed to a plurality of mobile stations is transmitted through an aggregation of at least two RF carriers of the plurality of RF carriers.

7. The apparatus of claim 6, wherein the at least two RF carriers are noncontiguous.

8. The apparatus of claim 7, wherein a first RF carrier of the at least two RF carriers is in a 700 Megahertz spectrum and a second RF carrier of the at least two RF carriers is in a 2.5 Gigahertz spectrum.

9. The apparatus of claim 1, wherein the apparatus is configured to operate in accordance with an Institute of Electrical and Electronics Engineers (IEEE) 802.16 standard.

10. A method comprising:
mapping, with a media access control (MAC) sublayer, bearer traffic to a plurality of transport channels;
mapping, with a mapper, the bearer traffic, through the plurality of transport channels, to a plurality of physical channels; and
transmitting, with a plurality of physical layers, the bearer traffic in the plurality of physical channels over a plurality of radio frequency (RF) carriers, the plurality of physical layers respectively corresponding to the plurality of RF carriers,
wherein each of the plurality of RF carriers has at least three physical channels of the plurality of physical channels including a downlink physical broadcast channel (DL-PBCH), a downlink physical control channel (DL-PCCH), and a downlink physical data channel (DL-PDCH); and
wherein said mapping, with the mapper, further comprises mapping multicast pilot channels, multicast shared channels, paging channels, synchronization channels, common control channels, or configuration channels to the DL-PBCH; unicast shared channels to the DL-PDCH; and dedicated control channels to the DL-PCCH.

11. The method of claim 10, wherein said mapping, with the mapper, further comprises:
dynamically mapping the bearer traffic to the plurality of physical channels according to a mapping criteria.

12. The method of claim 11, further comprising:
controlling the mapper with a resource control sublayer.

13. The method of claim 10, wherein the bearer traffic includes multicast and/or broadcast (MC/BC) services and unicast services and said mapping, by the mapper, further comprises:
mapping the bearer traffic according to a first mapping scheme in which a first physical layer of the plurality of physical layers receives both MC/BC services and unicast services or according to a second mapping scheme in which the first physical layer receives only MC/BC services and a second physical layer of the plurality of physical layers receives only unicast services.

14. The method of claim 13, wherein said mapping, by the mapper, further comprises:
selecting between the first mapping scheme or the second mapping scheme according to a mapping criteria.

15. The method of claim 10, wherein said transmitting further comprises:

transmitting bearer traffic directed to a plurality of mobile stations through an aggregation of at least two RF carriers of the plurality of RF carriers.

16. An apparatus comprising:

a media access control (MAC) sublayer configured to provide bearer traffic in a plurality of transport channels;

a mapper coupled to the MAC sublayer and configured to map the plurality of transport channels to a plurality of physical channels distributed across a plurality of radio frequency (RF) carriers, wherein each of the plurality of RF carriers has at least three physical channels of the plurality of physical channels including a downlink physical broadcast channel (DL-PBCH), a downlink physical control channel (DL-PCCH), and a downlink physical data channel (DL-PDCH)

wherein the mapper is further configured to dynamically map multicast pilot channels, multicast shared channels, paging channels, synchronization channels, common control channels, or configuration channels to the DL-PBCH; unicast shared channels to the DL-PDCH; and dedicated control channels to the DL-PCCH; and a plurality of physical layers coupled to the mapper and configured to transmit bearer traffic in the plurality of physical channels over the plurality of RF carriers, wherein the plurality of physical layers respectively correspond to the plurality of RF carriers, wherein transmission of the bearer traffic over the plurality of RF carriers is in accordance with an Institute of Electrical and Electronics Engineers (IEEE) 802.16 standard.

17. The apparatus of claim 16, wherein the mapper is configured to map the plurality of transport channels to the plurality of physical channels according to a first mapping scheme for a first time period and according to a second mapping scheme for a second time period.

18. The apparatus of claim 16, wherein the mapper is configured to map a first transport channel of the plurality transport channels to a first physical channel in a first RF carrier and a second physical channel and a second RF carrier.

19. The apparatus of claim 16, wherein the plurality of RF carriers are noncontiguous.

* * * * *